United States Patent [19]

Lapeyre

[11] 4,184,588

[45] * Jan. 22, 1980

[54] PRODUCT TRANSPORT CONVEYOR SYSTEM

[75] Inventor: James M. Lapeyre, New Orleans, La.

[73] Assignee: The Laitram Corporation, New Orleans, La.

[*] Notice: The portion of the term of this patent subsequent to May 8, 1996, has been disclaimed.

[21] Appl. No.: 821,137

[22] Filed: Aug. 2, 1977

[51] Int. Cl.² ............................................. B65G 21/18
[52] U.S. Cl. .................................... 198/778; 198/852
[58] Field of Search ............... 198/778, 347, 851, 852, 198/853, 850; 214/16 B, 16.4 R; 312/268

[56] References Cited

U.S. PATENT DOCUMENTS

| | | | |
|---|---|---|---|
| 1,614,056 | 1/1927 | Ayars | 198/778 X |
| 1,831,330 | 11/1931 | Thompson | 198/778 |
| 2,026,022 | 12/1935 | Devers | 198/778 X |
| 3,983,989 | 10/1976 | Wahren | 198/778 |

Primary Examiner—Robert B. Reeves
Assistant Examiner—Douglas D. Watts
Attorney, Agent, or Firm—Weingarten, Maxham & Schurgin

[57] ABSTRACT

A conveyor system for the transport of a product over a long travel path within a relatively small volume. A bi-directionally movable conveyor belt is disposed in a closed multiple loop path about at least one driving shaft having a number of sprockets therein each in driving engagement with a respective loop of the belt, and at least one idler shaft also having a number of sprockets, each in engagement with a respective loop of the belt. A travel path of substantial total length is provided within a small volume for movement of a product through the volume which can contain a controlled environment.

5 Claims, 4 Drawing Figures

U.S. Patent  Jan. 22, 1980  Sheet 1 of 2  4,184,588
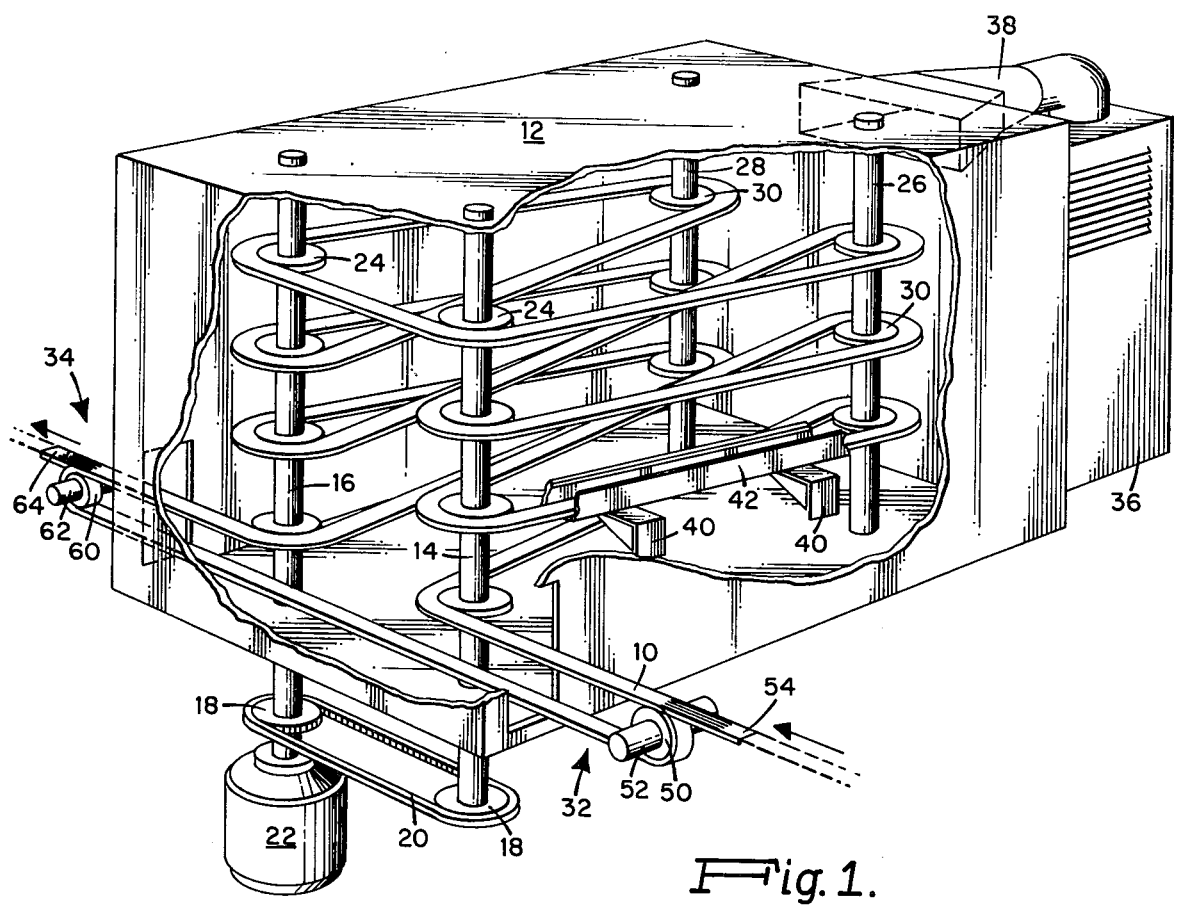
Fig. 1.
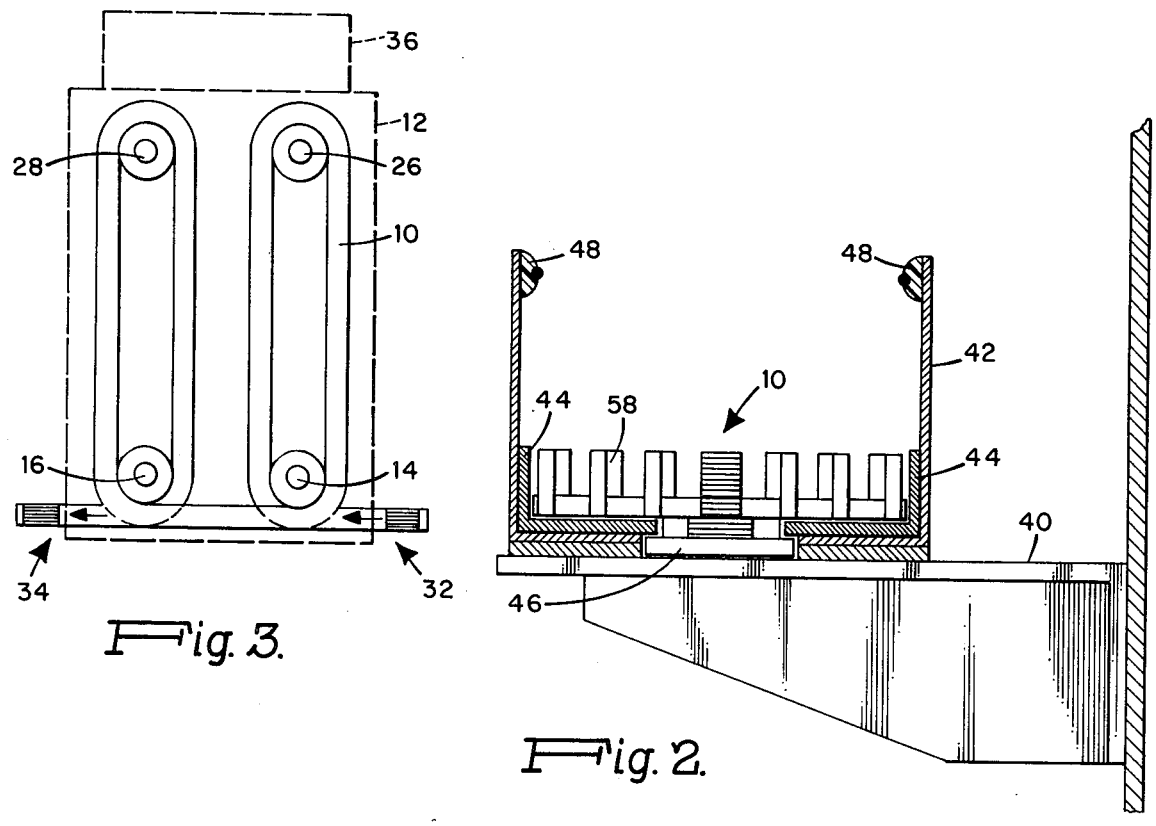
Fig. 3.
Fig. 2.

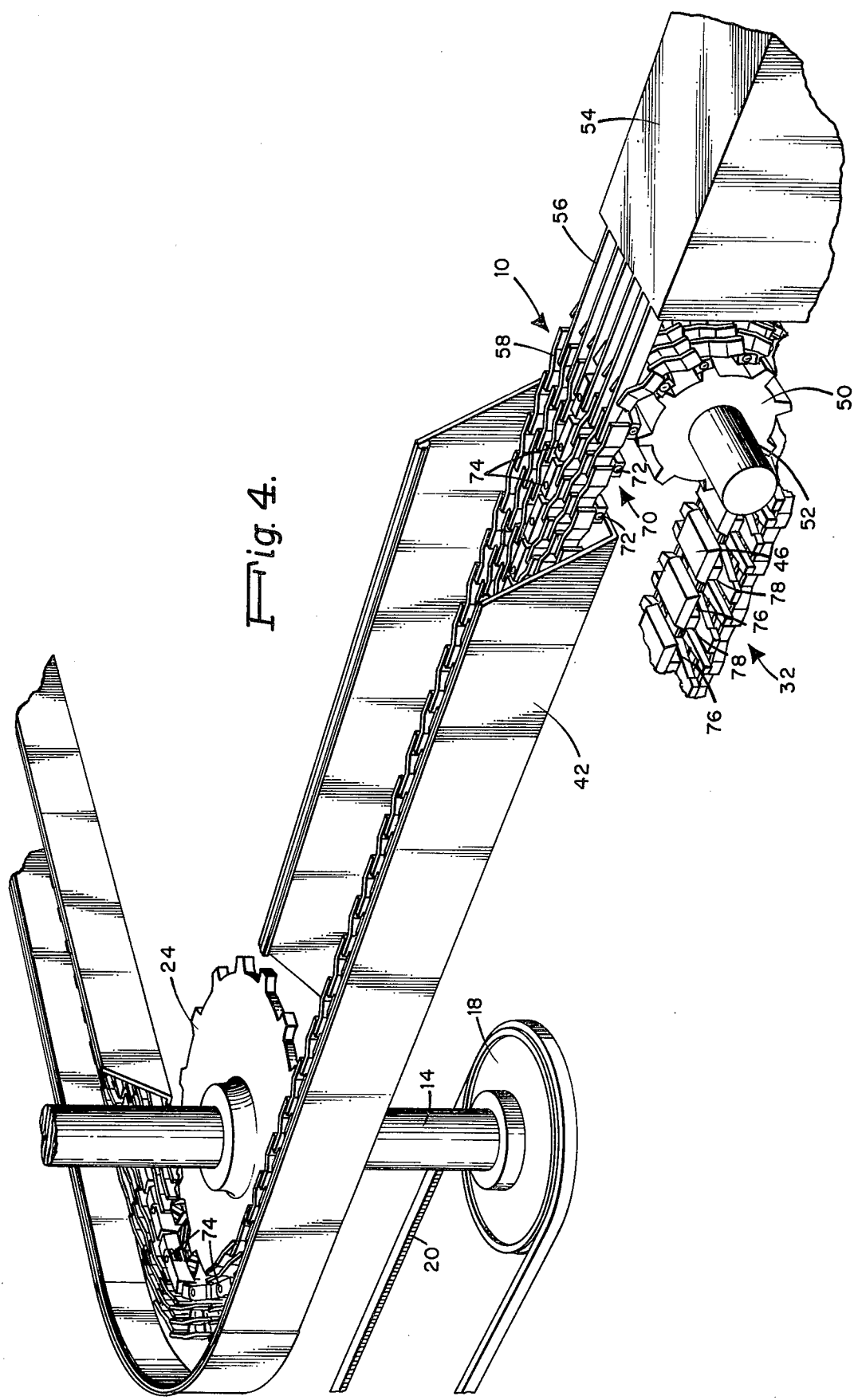

PRODUCT TRANSPORT CONVEYOR SYSTEM

FIELD OF THE INVENTION

This invention relates to conveyors and more particularly to a conveyor system providing a relatively long travel path within an enclosure containing a controlled environment for transport of a product therethrough.

BACKGROUND OF THE INVENTION

In the processing of food and other products, it is often required to transport the product through a chamber or enclosure having a controlled environment. Transport of the product is usually accomplished by a conveyor mechanism disposed in the chamber and having a loading section external to the chamber or accessible from outside of the chamber. The length of the travel path in a chamber is determined by the length of the conveyor that can be installed therein, and which, in turn, is governed by the turning characteristics of the conveyor and its manner of construction. Many conveyors of conventional construction require rather elaborate supporting structures which can occupy considerable space and which can detract from the space available for the conveyor itself. Other known conveyors have relatively large turning radii and therefore require a chamber of a size to accommodate conveyor movement.

SUMMARY OF THE INVENTION

Briefly, this invention provides a conveyor system especially for the transport of a product over a long travel path within a relatively small volume. The novel system comprises a bi-directionally movable conveyor belt capable of movement through turns in the conveyor plane and turns in a plane transverse to the conveyor plane, and capable of being driven by horizontally disposed sprockets engaging the side of the conveyor belt. The conveyor belt is disposed in a closed multiple loop path having a plurality of upwardly inclined courses and a plurality of downwardly inclined courses, a product supply section and a product removal section. At least one driving shaft is provided having a number of sprockets rotatable with the shaft, each sprocket being in driving engagement with a respective loop of the conveyor belt. At least one idler shaft is provided having a number of sprockets each associated with a respective loop of the conveyor belt. The novel conveyor belt is capable of movement about relatively short radii and can be disposed in a closed multiple loop path of substantial total length within a small volume.

DESCRIPTION OF THE DRAWINGS

The invention will be more fully understood from the following detailed description taken in conjunction with the accompanying drawings in which:

FIG. 1 is a partly cutaway pictorial view of a conveyor system according to the invention;

FIG. 2 is an elevation view, partly broken away, illustrating the support structure for the conveyor belt of the novel system;

FIG. 3 is a plan view of the novel system; and

FIG. 4 is a pictorial view, partly broken away, illustrating cooperation of the conveyor belt with horizontal and vertical sprockets.

DETAILED DESCRIPTION OF THE INVENTION

The conveyor belt employed in the present invention is itself the subject of copending application Ser. No. 768,531 now U.S. Pat. No. 4,136,621 filed Feb. 14, 1977, and assigned to the assignee of this invention and the disclosure of which is incorporated herein by reference. That conveyor belt comprises a plurality of identical interconnected modular links and capable of movement through straight and multiply curved travel paths. The conveyor is operative to be moved in a curved path in the conveyor plane and in a curved path in a plane transverse to the conveyor plane. Each link of the conveyor serves as an identical modular unit which includes linking ends pivotally connected to the linking ends of adjacent links for relative pivotal movement of adjacent links about a first axis. Each modular link is composed of two sections which are pivotally joined at a position intermediate the linking ends for relative pivotal movement of the sections about a second axis orthogonal to the first axis. Thus, the link sections are relatively pivotable in a first plane, while the adjacent links are relatively pivotable in an orthogonal plane, such that the conveyor belt composed of these interconnected links is bi-directionally movable to provide versatile transport along various intended paths.

The conveyor belt has a major feature, the capability of being driven by a horizontally disposed sprocket or by a vertically disposed sprocket. Moreover, the conveyor belt enjoys the capability of curved movement about relatively short radii. For example, the conveyor belt employed herein can move through a curve in the conveyor plane having diameter which is only two times the width of the belt; thus, a belt of four inch width can move through a turn having an eight inch diameter.

According to the present invention, the conveyor belt described above and which is the subject of the aforesaid copending application, is employed in a novel product transport system to provide conveyance of a product over a long travel path within a relatively small volume.

The invention is shown in a preferred embodiment in FIG. 1. The bi-directionally movable conveyor belt 10 is disposed in a closed multiple loop path for transport of a product through a chamber defined by enclosure 12. A pair of driving shafts 14 and 16 are disposed at one end of enclosure 12 and are coupled for rotation in unison by means of pulleys 18 and belt 20. An electric motor 22 or other appropriate motive source is coupled to shaft 16. A plurality of sprockets 24 are secured to respective shafts 14 and 16 for rotation therewith, each sprocket being in engagement with a respective loop of conveyor belt 10. A pair of idler shafts 26 and 28 are disposed at the opposite end of enclosure 12 from shafts 14 and 16, these idler shafts containing a plurality of idler sprockets 30, each idler sprocket being in engagement with a respective turn of conveyor belt 10. The idler sprockets 30 can be independently rotatable on their respective idler shafts or rotatable as a unit with the respective shafts. The driving shafts 14 and 16 and idler shafts 26 and 28 are appropriately mounted by any well known means.

The conveyor belt 10 is disposed in a travel path about the sprockets 24 and 30 within enclosure 12 and has a supply section 32 and a removal section 34 external to enclosure 12. The conveyor belt 10 is capable of movement about relatively short radii and is movable in both horizontal and vertical turns, such that a long travel path can be provided within a relatively small volume. As a result, a product being conveyed through a chamber by means of the novel conveyor system can be exposed to the environment of the chamber over a considerable period of time, while the chamber volume is of relatively small and reasonable size. As is illustrated in FIG. 1, the chamber within enclosure 12 can be provided with an appropriate environment by associated apparatus depicted by housing 36 and duct 38. For example, the chamber within the conveyor system is employed can be of a controlled temperature or controlled gaseous environment for processing of a product carried therethrough.

As seen in FIG. 1, the conveyor belt and products supported thereon moves from supply section 32 into enclosure 12, through a succession of upwardly inclined courses about shafts 14 and 26, and thence through a succession of downwardly inclined courses about shafts 16 and 28 to removal section 34. The conveyor belt 10 is supported along the travel path or along portions thereof, as needed, by a support structure such as illustrated in FIG. 2. Brackets 40 are affixed to the wall of enclosure 12 or other mounting structure for support of a channel-shaped member 42 formed typically of sheet metal. Plastic guide rails 44 are disposed in member 42 along the bottom wall thereof and upwardly along a portion of the side walls thereof. The conveyor belt 10 is supported on guide rails 44, with sprocket plates 46 of the conveyor belt disposed beneath the central opening between rails 44 and operative to retain the conveyor belt in the mounting channel. Bumper rails 48 also formed of a suitable plastic material can be provided along the upper edges of channel member 42 for guidance of a product carried by the conveyor belt.

At the supply section 32 shown in greater detail in FIG. 4, the conveyor belt 10 is disposed around a sprocket 50 rotatable about a horizontally disposed shaft 52. A transfer plate 54 of comb-like configuration is provided at the supply section with the spaced fingers 56 thereof disposed between the upstanding spaced ribs 58 of the conveyor belt 10 to provide a substantially continuous surface for supply of a product onto the conveyor belt. In similar manner, the conveyor belt at the removal section 34 is disposed around a sprocket 60 rotatable about a horizontally disposed shaft 62. A transfer plate 64 substantially similar to plate 54 is disposed with its spaced fingers between the spaced ribs 58 of belt 10 to receive products from the conveyor belt as the conveyor proceeds through a vertical turn around sprocket 60. The conveyor belt 10 is illustrated more particularly in FIG. 4 and includes a plurality of interconnected modular links 70 each composed of two link sections pivotally joined for relative movement about a normally horizontal axis defined by pivot pin 72. The plates 46 integrally formed with the modular links serve as sprocket teeth for cooperation with a vertical sprocket wheel, such as sprocket 50. A sprocket tooth for cooperation with a horizontal wheel, such as sprocket 24, is provided by the confronting surfaces 76 and 78 of adjacent links 70. A vertically disposed sprocket tooth of each modular link is intermediate a pair of horizontal pivots, while a horzontally disposed sprocket tooth of each link is intermediate a pair of vertical pivots, 74 the links being movable around turns of relatively short radii.

The modular links include a spaced array of upstanding ribs 58, the upper surface of which defines the conveying surface. The rib array of each link is in meshed interdigitated relationship to the array of ribs on adjacent links to provide an effectively continuous flat conveying surface even during movement of the conveyor through a curved path in the conveyor plane. The links are preferably molded of a high strength plastic material, while the interconnecting pins pivotally joining the links and link sections can also be of the same or compatable plastic material.

The invention is not to be limited by what has been particularly shown and described except as indicated in the appended claims.

What is claimed is:

1. A conveyor system for transport of a product over a long travel path within a relatively small volume and comprising:

a bi-directionally movable conveyor belt having a plurality of identical interconnected modular links and capable of movement through turns in horizontal and vertical planes, and capable of being driven by a sprocket rotatable about a vertical axis;

said plurality of modular links each having:

a first section terminating in first and second linking ends disposed along a conveyor axis;

a second section terminating in third and fourth linking ends disposed along said conveyor axis;

said second linking end of said first section being pivotally coupled to said third linking end of said second section for pivotal movement of said first and second section about a horizontal axis transverse to the conveyor axis;

said first linking end of each of said links being pivotally coupled to said fourth linking end of an adjacent link for pivotal movement about a vertical axis orthogonal to said conveyor axis and said horizontal axis;

a spaced array of upstanding ribs on said links in meshed interdigitated relationship to provide an effectively continuous conveying surface;

a sprocket plate integral with each of said links disposed intermediate a pair of horizontal pivots and operative to mesh with a vertical sprocket;

a sprocket tooth integral with each of said links disposed intermediate a pair of vertical points and operative to mesh with a horizontal sprocket;

means for disposing said conveyor belt in a closed multiple loop path having a plurality of upwardly inclined courses, a plurality of downwardly inclined courses, a product supply section and a product removal section;

at least one vertically disposed drive shaft having a plurality of drive sprockets rotatable in horizontal planes, each sprocket in driving engagement with the sprocket teeth of the links of a respective horizontally disposed loop of the conveyor belt;

means coupled to said at least one drive shaft to cause rotation thereof and of said drive sprockets;

at least one vertically disposed idler shaft having a plurality of idler sprockets rotatable in horizontal planes, each in engagement with the sprocket teeth of the links of a respective horizontally disposed loop of the conveyor belt;

the inclined courses of said conveyor belt extending between said at least one drive shaft and said at least one idler shaft; and at least two vertical sprockets rotatable in vertical planes and each in engagement with the sprocket plates of the links of a respective vertically disposed loop of the conveyor belt.

2. The conveyor system of claim 1 further including an enclosure substantially surrounding said conveyor system; and means providing a selected controlled environment within said enclosure.

3. The conveyor system of claim 1 wherein said disposing means includes a support structure disposed along at least a portion of said travel path and having a channel-shaped member supporting said conveyor belt, and guide rails below which said sprocket plates are disposed for retention of the conveyor belt.

4. The conveyor system of claim 2 wherein said product supply section and a product removal section are each disposed external to said enclosure.

5. The conveyor system of claim 1 wherein said disposing means includes, for said product supply section and said product removal section, a sprocket rotatable in a vertical plane and about which said conveyor belt is movable through a vertical turn along the closed multiple loop path.

* * * * *